United States Patent [19]

Yoshida et al.

[11] Patent Number: 4,529,920
[45] Date of Patent: Jul. 16, 1985

[54] CONTROL APPARATUS FOR AN AUTOMATIC DOOR WITH A MINIMUM ERROR IN A DETECTED DOOR POSITION

[75] Inventors: Yukio Yoshida; Kenzo Oono, both of Toyama, Japan

[73] Assignee: Yoshida Kogyo K. K., Tokyo, Japan

[21] Appl. No.: 430,954

[22] Filed: Sep. 30, 1982

[30] Foreign Application Priority Data

Dec. 23, 1981 [JP] Japan ............................... 56-207199

[51] Int. Cl.³ ............................................. G05B 5/01
[52] U.S. Cl. ..................................... 318/466; 318/468
[58] Field of Search ................................ 318/466–468, 318/480, 561, 565

[56] References Cited

U.S. PATENT DOCUMENTS

4,234,833 11/1980 Barrett ............................ 318/468 X

Primary Examiner—William M. Shoop
Assistant Examiner—Saul M. Bergmann
Attorney, Agent, or Firm—Hill, Van Santen, Steadman & Simpson

[57] ABSTRACT

In an apparatus for controlling operation of an automatic door with minimum error in a detected door position, a motion sensor is positioned relative to a movable driving member coupled to the door. Pulses having a pulse repetition rate are created in direct proportion to a velocity of movement of the driving member. The pulses are counted and current position of the door determined. Any error arising from a loss or slip in an intermediate transmission mechanism which couples a motor with the final driving member is substantially eliminated. A pair of motion sensing elements as opto-electronic couplers may be provided for sensing a phase relationship between the sensing elements defining a direction of door movement. A pulse interval monitor adapted to generate a signal indicative of a long lapse of time between adjacent pulses from the sensing element may be provided. A sequence control circuit responsive to this generated signal generates a stop command for the motor.

16 Claims, 6 Drawing Figures

CONTROL APPARATUS FOR AN AUTOMATIC DOOR WITH A MINIMUM ERROR IN A DETECTED DOOR POSITION

BACKGROUND OF THE INVENTION

1. Field of the Invention

The present invention relates to an automatic door system, and more particularly to an apparatus for controlling such a system.

2. Description of the Prior Art

A typical automatic door system has a door coupled with and driven by a belt extending from a drive pulley to its driven pulley. The drive pulley is driven by a reversible motor. Controlled rotation of the reversible motor provides automatic opening and closing of the door. In the Japanese Patent Public Disclosures 19366/80 and 28982/81, there is disclosed a prior art apparatus for controlling such a door system which employs, as means for tracking the movement of a door, a revolution sensor mounted on the shaft of the door drive motor for generating signals indicating the number of revolutions of the motor.

However, the above sensing of the door movement is an indirect one, and ignores the error in the transmission mechanism from the motor to the door to be driven. For example, a slip sometimes occurs between the shaft of the motor and a transmission mechanism in the form of, for example, a belt which extends to a drive pulley and/or between the drive pulley and a belt extending from the drive pulley and its driven pulley. Such slips introduce an error between the sensed door position and the actual door position. This might result in collisions of the door against its counterpart or a wall, or stopping of the door before it reaches its stroke end.

Further, continued running of the motor occurs when the transmission mechanism such as a belt is cut. This will burn the motor coils since the motor for driving a door is designed to be short-time rated.

SUMMARY OF THE INVENTION

With the above in mind, an object of the present invention is to provide an apparatus for controlling an automatic door system in such a manner that the detected position of the door coincides accurately with the actual position thereof.

Another object of the present invention is to provide an apparatus for controlling an automatic door system which assures that any damaging collision of the door against its counterpart is to be avoided so that the door is moved smoothly between ends of its stroke.

Another object of the present invention is to provide an apparatus for controlling an automatic door system which prevents overheating of a motor for driving the door by stopping the motor in cases where the coupling between the motor and transmission means in the form of, for example, a belt is disconnected.

In accordance with a broad aspect of the present invention, there is provided an apparatus for controlling the operation of an automatic door comprising: an electric motor; reciprocally movable driving means mechanically coupled with said motor and directly coupled to the door; sensing means relative to said movable driving means for generating pulses having a pulse repetition rate in proportion to the velocity of said movable driving means; door position detecting means electrically coupled with said sensing means for counting said pulses to obtain the current door position; and control means responsive to the obtained current door position for controlling the operation of said motor.

BRIEF DESCRIPTION OF THE DRAWINGS

The above and other objects, features and the advantages of the present invention will be apparent as the description proceeds in conjunction with the drawings in which.

DETAILED DESCRIPTION OF THE PREFERRED EMBODIMENT

Figure 1:
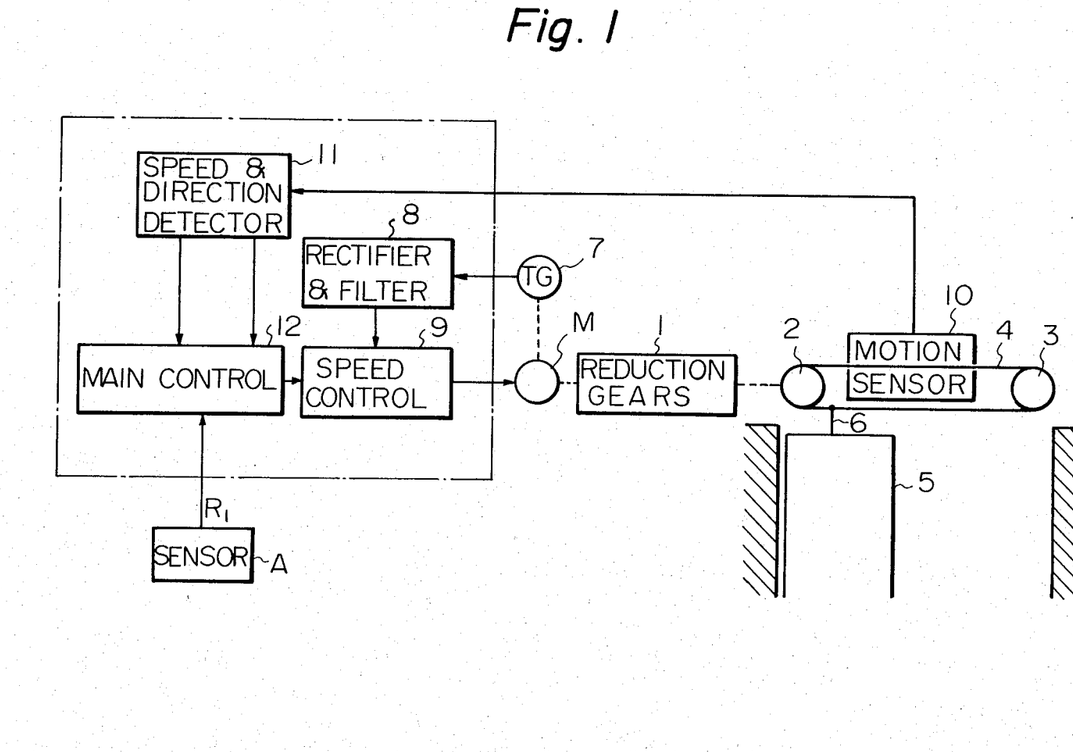
FIG. 1 is a schematic and block diagram of the entire automatic door system incorporating the concept of the present invention.

FIG. 1 is a diagrammatic view of the entire door control system. A motor designated by M is coupled with a drive pulley 2 through a belt (not shown) and a reduction gear 1. A belt 4 extends from the drive pulley 2 to a driven pulley 3 and is coupled to a door 5 by means of a coupling member 6. Therefore, a forward and reverse rotation of the motor M will provide an opening and closing of the door 5.

A tacho generator 7 in the form of an alternator is coupled with the motor M to produce an output signal which passes through a rectifier and ripple filter circuit 8 to a conventional speed control circuit 9. A sensor A in the form of such as a mat switch, a photoelectric tube and so on is adapted to detect the approach of a person to the door 5 to produce and supply a signal $R_1$ to the main control 11 which in turn will generate control signals to control the speed control circuit 9 to drive the motor M.

In accordance with the present invention there is provided a door motion sensing means 10 disposed relative to the driving belt 4. The sensing means 10 operatively produce a sensed signal indicative of the motion of the driving belt and supplies it to the main control 12 through a speed and direction detector 11.

The details of each component will now be described.

Figure 2:
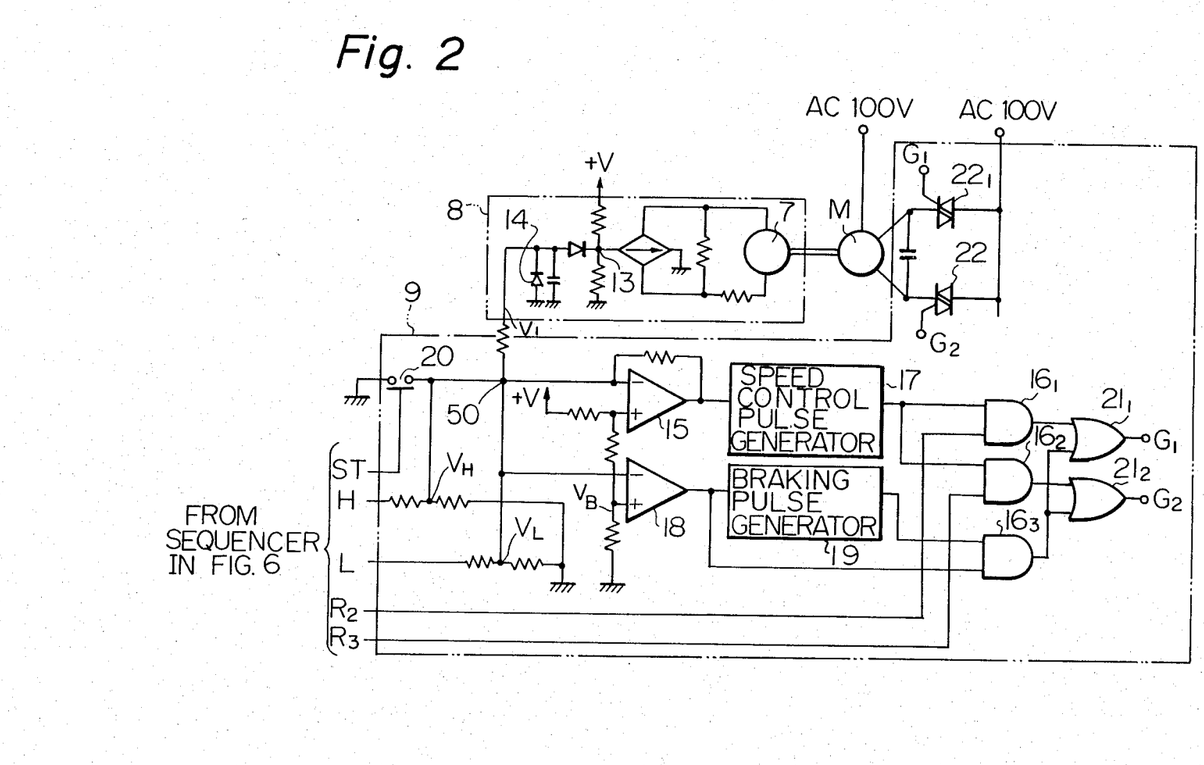
FIG. 2 shows part of the system in FIG. 1 illustrating a speed control of a motor for driving the door.

As shown in FIG. 2, the tacho generator 7 is coupled to a rotation axis of the motor M and generates an AC voltage in response to the rotation of the motor M. The generated voltage will increase and decrease in amplitude and frequency as the motor M runs at higher and lower speeds, respectively.

The rectifier and ripple filter circuit 8 comprises a diode bridge 13 adapted to provide a full-wave rectification of the output voltage from the tacho generator 7 and a ripple filter 14 adapted to obtain a smoothed DC voltage $V_1$. The output voltage $V_1$ is in proportion to the rotational speed of the motor M and is supplied to the speed control circuit 9.

The speed control circuit 9 includes an operational amplifier 15 adapted to amplify the resulting voltage at junction 50 determined by the output voltage $V_1$ from the rectifier and ripple filter circuit 8 and a set voltage of $V_H$ or $V_L$; $V_H$ indicates a predetermined high speed while $V_L$ indicates a predetermined low speed. The output of the operational amplifier 15 is connected to a speed control pulse generator 17 adapted to generate pulses in accordance with the amplitude of the signal from the operational amplifier 15 and supply them to first and second AND gates $16_1$ and $16_2$. An operational amplifier 18 compares the voltage at junction 50 determined by the output voltage $V_1$ from the rectifier and ripple filter circuit 8 and the set voltage of $V_H$ or $V_L$, with the voltage at $V_B$ and generates a braking signal when the voltage $V_B$ becomes higher than the voltage $V_C$. The braking signal is applied to a third AND gate $16_3$ and also to a braking pulse generator 19 which responsively produces braking pulses and applies them to the third gate $16_3$. A stop signal ST is used to operate a stop switch 20 so that the output voltage $V_1$ is grounded. A signal $R_2$ indicates a forward rotation of the motor M and is supplied to the first AND gate $16_1$. A signal $R_3$ commands a reverse rotation of the motor M and is supplied to the second AND gate $16_2$. The output signals from the first and second AND gates $16_1$ and $16_2$ are connected to first and second OR gates $21_1$ and $21_2$, respectively. The output signal from the third AND gate is connected to both the first and second OR gates $21_1$ and $21_2$. Thus, when the forward signal $R_2$ is generated, speed control pulses from the pulse generator 17 pass through the enabled first AND gate $16_1$ and the first OR gate $21_1$ to a gate electrode $G_1$ of a first triac $22_1$ for forward rotation of the motor M. On the other hand, when the reverse signal $R_3$ is generated, speed control pulses from the pulse generator 17 pass through the enabled second AND gate $16_2$ and the second OR gate $21_2$ to a gate electrode $G_2$ of a second triac $22_2$ for reverse rotation of motor M. In this manner, the motor M is controlled to selectively run at a high speed set by the voltage $V_H$ or a low speed set by the voltage $V_L$ and to be braked by the activation of the stop switch 20 in response to the stop signal ST so that the door 5 will correspondingly move at a high or low speed and will be stopped.

Figure 3:
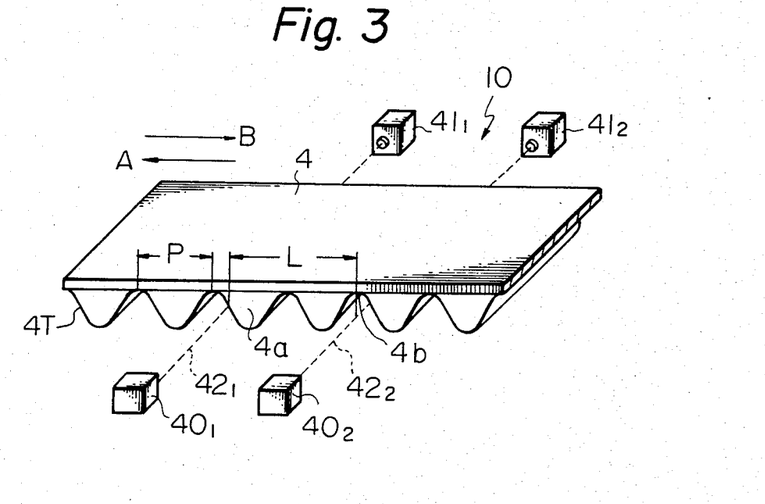
FIG. 3 is a perspective view of sensor arrangement which senses the motion of a driving belt directly coupled with the door in accordance with the present invention.

FIG. 3 shows an embodiment of the motion sensing means 10 disposed relative to the drive belt 4 directly coupled to the door for generating a signal indicative of the motion of the drive belt 4. The illustrated sensing means include two optoelectronic couplers each having an optical path across the width of the drive belt. The first optoelectronic coupler comprises a first light emitting device $40_1$ and a first light receiving device $41_1$ aligned with the light emitting device $40_1$ along a first light path $42_1$. Similarly, the second optoelectronic coupler comprises a second light emitting device $40_2$ and a second light receiving device $41_2$ in alignment with the light emitting device $40_2$ along a second light path $42_2$. The illustrated drive belt 4 is a synchronous or timing belt having evenly spaced teeth 4T on the bottom surface thereof. The pitch between adjacent teeth is designated by P.

As shown in FIG. 3, the first optoelectronic coupler is spaced from the second optoelectronic coupler by a distance L along the direction of reciprocal motion of the drive belt 4. The illustrated distance L is selected at $L = P \times n + P/4$ where P is the pitch between adjacent teeth of the bottom surface of the drive belt, and n is an integer (0, 1, 2 . . . ). Alternatively, the distance may be selected at $L = P \times n - P/4$. In other words, the first optoelectronic coupler is out of phase with the second optoelectronic coupler by ninety degrees in terms of cyclic profile defined by the teeth of the drive belt so that when the second light path $42_2$ of the second optoelectronic coupler is aligned with the center 4b between adjacent teeth, the first optoelectronic coupler is positioned at the boundary between a tooth and a space.

Figure 4:
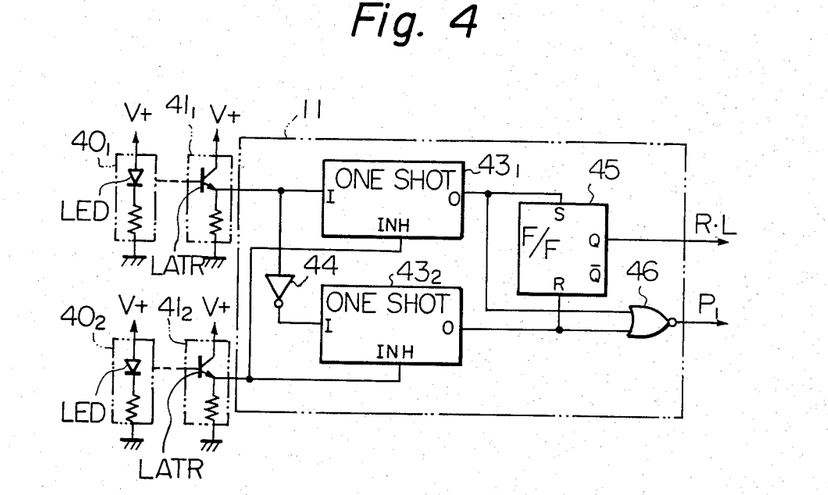
FIG. 4 shows a circuit diagram of a speed sensing and direction determining circuit.

As shown in FIG. 4, each of the light emitting devices $40_1$ and $40_2$ includes a light emitting diode LED as a light source. Each of the light receiving devices $41_1$ and $41_2$ includes a light activated or photo transistor LATR. Output signals from the first and second photo transistors are connected to the speed and direction detector 11.

The speed and direction detector 11 includes a first one shot or monostable multivibrator $43_1$ having an input coupled with the first photo transistor and an inhibit terminal INH coupled with the second photo transistor. The detector 11 also includes a second one shot or monostable multivibrator $43_2$ having an input coupled to the first photo transistor via an inverter and an inhibit terminal INH coupled to the second photo transistor. Each of the one shots $43_1$ and $43_2$ operatively generates a single pulse having a definite duration in response to a pulse at its input; however, when there is a signal at its inhibit terminal INH, this inhibits the associated one shot from generating any pulse.

The output O of the first one shot $43_1$ is connected to a set terminal S of a flip flop or bistable multivibrator 45 and to an input of a NOR gate 46. The output O of the second one shot $43_2$ is connected to a reset terminal R of the flip flop 45 and to another input of the NOR gate 46. The flip flop 45 operatively determines the direction of movement of the door driving belt 4 from input conditions and generates a signal R/L indicative of the direction at its output Q to supply it to the main control 12. The NOR gate 46 operatively produces a train of pulses $P_1$ having a pulse repetition rate in proportion to the velocity of the door drive belt 4.

Figure 5:
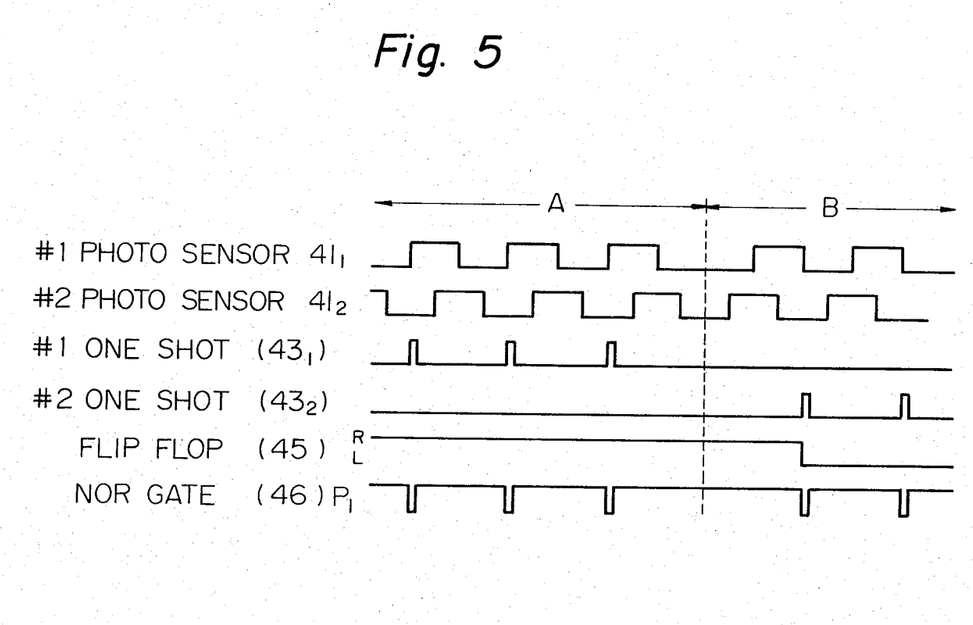
FIG. 5 is a timing chart of the operation of the circuit shown in FIG. 4.

FIG. 5 shows a timing chart of the operation of the speed and direction detector circuit shown in FIG. 4.

When the drive belt 4 is moving in a direction as indicated by an arrow A (i.e. when the door is being advanced toward its open position), the first and second photo detectors $41_1$ and $41_2$ generate pulses occurring in a period A as shown in FIG. 5. It is noted that the pulses from the first detector $41_1$ are out of phase with or lead the pulses from the second detector $41_2$ by an angle of ninety degrees. Thus, in response to each positive-going transition of the pulses from the first photo detector $41_1$, one shot $43_1$ generates a single pulse having a definite duration at its output terminal O. However, the second one shot $43_2$ is inhibited by a signal to its inhibit terminal $43_2$ from generating any pulse at its output terminal O.

Thus, the NOR gate 46 selects pulses from the first one shot $43_1$ and supplies them to the main control. Similarly, flip flop 45 is set by a pulse from the first one shot to generate, at its output terminal O, a high level signal R indicative of the opening of the system operation (i.e. the door is being advanced toward its open position).

Conversely, when the drive belt 4 is moving in an opposite direction as indicated by an arrow B in FIG. 4 (i.e. when the door is moving back to its close position), the first and second photo detectors $41_1$ and $41_2$ generate pulses occurring in a period B as shown in FIG. 5. In this case, the pulses from first detector $41_1$ have a phase lag of ninety degrees relative to the pulses from second photo detector $41_2$. Thus, in response to each negative-going transition of pulses from the first photo detector $41_1$ (each positive-going transition of pulses appearing at the input terminal I of the second one shot), the second one shot $43_2$ generates a single pulse having a predetermined duration at its output terminal O. However, the first one shot $43_1$ is inhibited since a high level or inhibit signal from the second photo detector $41_2$ appears at the inhibit terminal INH of the first one shot $43_1$ at the time of positive-going transition of the input signal thereto, thus disenabling the first one shot from being triggered. Accordingly, the NOR gate 46 selects pulses from the second one shot $43_2$ and supplies them to the main control, while flip flop 45 is reset by a pulse from the second one shot to generate at its output terminal O, a low level signal L indicative of the closing mode of the system operation (i.e. the door is moving back to its close position).

Figure 6:
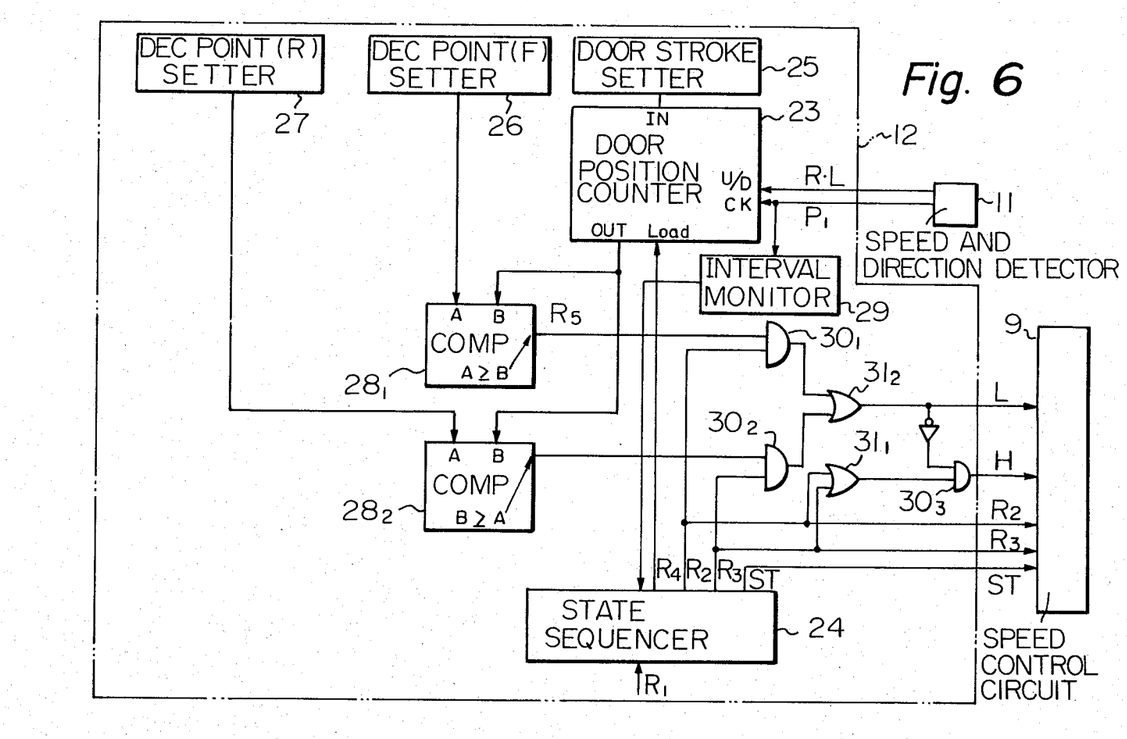
FIG. 6 shows part of the system in FIG. 1 illustrating the main control.

Referring now to FIG. 6, there the main control 12 is illustrated in greater detail. The main control 12 includes a door position measuring means 23 in the form of counter adapted to count pulses $P_1$ having frequencies in proportion to the speed of the reciprocal movement of the door driving belt 4. The overall operation of the main control 12 is controlled by a state sequencer 24 provided therein which selectively generates a series of commands and state signals to various components in and out of the main control 12 in a predetermined sequence. The main control 12 includes a door stroke setter 25 for setting a predetermined value of the stroke of the door to be used. The door stroke setter 25 supplies the set value of stroke to the door position counter 23. Since a complete cycle of door operation comprises a door opening operation during which the door moves from one end of stroke (fully closed) to the other end of stroke (fully open) and a door closing operation during which the door moves reversely, the main control 12 includes two channels one for handling the opening mode of operation and the other for handling the closing mode of operation. Among the first channel associated with the door opening mode are a deceleration point setter 26 for setting a deceleration point when the door moves forward to open and a comparator $28_1$ for comparing the current door position from the counter 23 with the deceleration point from the setter 26. Similarly, the second channel associated with the door closing mode of operation comprises a deceleration point setter means 27 and a second comparator $28_2$.

The main control 12 further includes a pulse interval monitor or stroke end detector 29 which may comprise a counter for counting pulses from an oscillator therein adapted to generate pulses having a relatively high frequency. The counter counts pulses as supplied during one cycle of pulses $P_1$ having frequency in proportion to the speed of the door. When the count per cycle becomes greater than a selected value, the pulse interval monitor or stroke end detector 29 signals when the door reaches the end of stroke.

Finally, a gate circuit is provided which selectively supplies high and low speed commands H and L to the speed control 9. The illustrated gate circuit includes a first AND gate $30_1$ adapted to receive the output of the first comparator $28_1$ and a forward rotation command $R_2$ from the sequencer 24 and a second AND gate $30_2$ adapted to receive the output of the second comparator $28_2$ and a reverse rotation command $R_3$ from the sequencer 24. The outputs of the AND gates $30_1$ and $30_2$ are connected to the OR gate $31_2$ which selectively generates and passes a low speed command L to the speed control 9. The output of the OR gate $31_2$ is also connected via an invertor to one input of a third AND gate $30_3$. The other input of the third AND gate $30_3$ is connected to an OR gate $31_1$ adapted to receive the forward and reverse rotation commands $R_2$ and $R_3$ from the sequencer 24. The third AND gate selectively generates and passes a high speed command H to the speed control 9.

The operation of the main control 12 will now be described.

When the sensor A detects the approach of a person to the door, it will generate a signal $R_1$. Responsively, the state sequencer 24 generates a signal $R_4$ and supplies it to the counter 23 which in turn receives a signal indicative of a predetermined stroke length of the door as set in the stroke setter 25.

At the same time, the state sequencer 24 generates a door opening signal $R_2$ (command of the forward rotation of the motor) and supplies it to the speed control 9. The signal $R_2$ is further supplied to the first OR gate $31_1$ and the third AND gate $30_3$ which, in turn, generates a high speed command signal H and supplies it to the speed control 9 so that the motor will accelerate and run at a high speed indicated by the command signal H in a forward direction indicated by the forward command signal $R_2$. Thus, the door 5 will move at a corresponding high speed toward its open position.

The movement of the drive belt 4 in the direction A (corresponding to the opening direction of the door) is detected by the motion sensor 10 including two spaced photo transistors which generate first and second train of pulses having a phase relationship determined by the direction A of the belt movement. Thus, the speed and direction detector 11 determines that the door is moving toward its open position and supplies a direction signal R to put the door position counter 23 in the count down mode of operation. Further, the speed and direction detector 11 selects the first train of pulses from the first photo transistor and supplies it as a train of pulses $P_1$ to the clock input to the door position counter 23. Responsively, the counter 23 counts the pulses $P_1$ down from the value of stroke set in the door stroke setter 25 to obtain the current position of the door. The results of the respective counting down operations by the counter 23 are successively supplied to the first comparator $28_1$ which compares the successive position data each indicating the current position of the door with a deceleration point in the opening mode, as stored in the setter 26. When the current position coincides with the stored deceleration point, the first comparator $28_1$ generates a signal and supplies it through the AND gate $30_1$ enabled by the door opening signal $R_2$ to the second OR gate $31_2$ to produce a low speed command signal L. Upon this signal, the motor M decelerates toward a selected low speed in a forward direction. The door 5 correspondingly is decelerated.

When the door reaches a stroke end (full open), the pulse interval monitor 29 senses it by detecting an increased interval between pulses $P_1$ due to a decrease in the door speed, and signals to the sequencer 24.

When the door reaches a stroke end (full open), the stroke end detector 29 senses it and signals to the sequencer 24. Responsively, the state sequencer 24 generates a stop command ST and supplies it to the speed control 9 by which the motor is stopped.

Then, in accordance with its sequential logic the state sequencer 24 generates a door closing command signal R₃ (command of the reverse rotation of the motor) and supplies it to the speed control 9. The signal R₃ is also supplied to the second AND gate 30₂ to put it in an enabled condition. Further, the signal R₃ is supplied through the first OR gate 31₁ to the third AND gate 30₃ which, in turn, generates a high speed command signal H and supplies it to the speed control 9. Accordingly, the motor will accelerate and run at a high speed indicated by the command signal H in a reverse direction indicated by the reverse command signal R₃. Thus the door will move at a corresponding high speed toward its close position.

The movement of the drive belt 4 in the direction B (corresponding to the closing direction of the door) is detected by the motion sensor 10. In response to the signals from the sensor 10, the speed and direction detector determines the direction of the movement of the door and supplies a signal L to put the door position counter 23 into the count up mode of operation. Further, the speed and direction detector 11 selects the second train of pulses from the second photo transistor and passes it as a train of pulses P₁ having a pulse repetition rate corresponding to the speed of the drive belt to the door position counter 23. Responsively, the counter 23 counts up the pulses to obtain the current position of the door.

Thereafter the high speed running of the door continues until the measured current position of the door coincides with a deceleration point in the closing mode, as stored in the setter 27. Then, the second comparator 28₂ generates a coincident signal which is passed through the second AND gate to the second OR gate which, in turn, generates and supplies a low speed command signal L to the motor speed control 9. The low speed running of the door under the command L continues until the door reaches the other end of stroke (full closed). Then, the motor and, therefore, the door are stopped, and the door operation is completed.

As is noted from the above, the illustrated door control system employs drive belt motion sensing means for generating pulses having a pulse repetition rate in proportion to the speed of the drive belt 4 which is "directly" coupled to the door as a final load to be controlled, and door position measuring means for counting such pulses to obtain the current position of the door. Therefore, the measured position of the door 5 coincides accurately with the actual door position. In particular, the measured door position signal does not include any error associated with a slip in a transmission mechanism between the motor and the reduction gears and a slip between the drive pulley and the drive belt. Thus collision of the door with the counterpart and/or premature stop of the door before it reaches the stroke end can be avoided so that a smooth operation of opening and closing the door may be attained.

Further, the motion sensing means (light emitting device 40 and receiving device 41) may be placed at any position in a reciprocally moving stroke or path of the drive belt 4. This will minimize the length of electric wires for connecting the motion sensing means to the speed and direction detector 11 since both of them may be built in or placed near a controller including the main control 12 disposed near the drive belt, and simplify the connection work associated therewith.

The direction detector determines whether the door is moving toward either its open position or close position. This will simplify the sequence logic used in the state sequencer 24.

In case, for example, that the door drive belt and the door are erroneously stopped because the drive belt is accidentally disengaged from the drive pulley, this is positively sensed by the pulse interval monitor 29 in cooperation with the motion sensing means and speed and direction detector, and conditions the sequencer 24 to generate a stop command ST, thus stopping the motor which would otherwise run continuously and be overheated.

Whereas a timing belt is preferred as the transmission means 4, other transmission means such as V-belt, flat belt and chain can be substituted.

Whereas the illustrated motion sensor 10 comprises optoelectronic devices, other sensing technique such as the use of magnetic sensors, contact-type sensors and iron segment sensors may be employed.

In brief, the motion sensing means may be implemented by any conventional sensor. However, it is important that such a sensor be disposed relative to a door driving member (e.g. drive belt 4) directly coupled to the door and operatively generate a signal in the form of, for example, a train of pulses having pulse repetition rate accurately in proportion to the speed of the movement of the door driving member.

While the present invention has been described with respect to the illustrated embodiment, it is to be construed that various other modifications and variations can be made well within the scope and spirit of the invention as defined in the appended claims.

What is claimed is:

1. An apparatus for controlling the operation of an automatic door comprising:
an electric motor;
reciprocally movable driving means mechanically coupled with said motor and directly coupled to the door;
sensing means disposed relative to said movable driving means for generating pulses having a pulse repetition rate in proportion to the speed of said movable driving means;
door position detecting means electrically coupled with said sensing means for counting said pulses to obtain the current door position; and
control means responsive to the obtained current door position for controlling the operation of said motor.

2. An apparatus as claimed in claim 1 wherein said movable driving means comprises a drive belt directly coupled to the door and extending from a drive pulley and a driven pulley.

3. An apparatus as claimed in claim 2 wherein said drive belt is a synchronous belt having equally spaced teeth on the bottom surface thereof.

4. An apparatus as claimed in claim 3 wherein said sensing means comprise a pair of optoelectronic couplers spaced from each other in the direction of the movement of said synchronous belt, the light from the light emitting portion to the light receiving portion of each of said optoelectronic couplers being intermittently interrupted by successive teeth of said synchronous belt in response to the movement thereof.

5. An apparatus as claimed in claim 4 wherein the first of said optoelectronic couplers operatively produces pulses having a first predetermined phase relationship with the phase of pulses produced by the second of said optoelectronic couplers in response to the movement of said synchronous belt in a forward direction while said first optoelectronic coupler produces pulses having a second predetermined phase relationship, distinguishable from said first phase relationship, with the phase of pulses produced by said second optoelectronic couplers in response to the movement of said synchronous belt in a reverse direction.

6. An apparatus as claimed in claim 5 further including direction detecting means coupled with said pair of optoelectronic couplers for determining the direction of movement of said synchronous belt from the sensed phase relationship between pulses from the first and second optoelectronic couplers.

7. An apparatus as claimed in claim 1 further including pulse interval monitor means for monitoring an interval between adjacent pulses from said sensing means and selectively generating a signal indicating that the interval has become greater than a predetermined length of time wherein said control means responds to said signal from said pulse interval monitor means to produce a stop command signal for said motor, thus avoiding the overheating of said motor which would be encountered in case that the transmission means from said motor to the door is disconnected.

8. In a door controlling system including a door, means for driving said door to run between ends of its stroke having final movable transmission means directly coupled to said door, speed control means for controlling said driving means in such a manner that said door will be initially accelerated from one end of said stroke, then run at a high speed, then be decelerated, then run at a low speed, and finally stop at the other end of said stroke, thus completing one stroke operation of said door, the improvement comprising:
sensing means disposed relative to said final movable transmission means for generating pulses having a pulse repetition rate in proportion to the velocity of the movement of said final transmission means;
door position detecting means for counting said pulses from said sensing means to obtain the current position of said door;
means for providing a deceleration point associated with said one stroke operation of said door; and
means electrically coupled with said speed control means for comparing said current position of said door with said deceleration point to generate a low speed command upon the coincidence of said current position with said deceleration point so that said speed control means will decelerate said door toward said low speed in response to the generation of said low speed command.

9. A door controlling system, comprising:
a door having a given stroke;
driving means for driving said door to run between ends of its stroke, and including final movable transmission means directly coupled to said door;
speed control means for controlling said driving means in such a manner that said door will be initially accelerated from one end of said stroke, then run at a high speed, then be decelerated, then run at a low speed, and finally stop at the other end of said stroke, thus completing one stroke operation of said door;
sensing means disposed relative to said final movable transmission means for generating pulses having a pulse repetition rate in proportion to a velocity of movement of said final transmission means;
door position detecting means for counting said pulses from said sensing means to obtain a current position of said door;
means for providing a deceleration point associated with said one stroke operation of said door; and
means electrically coupled with said speed control means for comparing said current position of said door with said deceleration point to generate a low speed command upon a coincidence of said current position with said deceleration point so that said speed control means will decelerate said door toward said low speed in response to generation of said low speed command.

10. A system as claimed in claim 9 wherein said final movable transmission means comprises a drive belt directly coupled to the door and extending from a drive pulley and a driven pulley.

11. A system as claimed in claim 10 wherein said drive belt is a synchronous belt having equally spaced teeth on the bottom surface thereof.

12. A system as claimed in claim 11 wherein said sensing means comprise a pair of optoelectronic couplers spaced from each other in a direction of movement of said synchronous belt, light from a light emitting portion to a light receiving portion of each of said optoelectronic couplers being intermittently interrupted by successive teeth of said synchronous belt in response to movement thereof.

13. A system as claimed in claim 12 wherein a first of said optoelectronic couplers operatively produces pulses having a first predetermined phase relationship with a phase of pulses produced by a second of said optoelectronic couplers in response to movement of said synchronous belt in the forward direction while said first optoelectronic coupler produces pulses having a second predetermined phase relationship distinguishable from said first phase relationship with a phase of pulses produced by said second optoelectronic couplers in response to movement of said synchronous belt in a reverse direction.

14. A system as claimed in claim 13 further including direction detecting means coupled with said pair of optoelectronic couplers for determining direction of movement of said synchronous belt from the sensed phase relationship between pulses from the first and second optoelectronic couplers.

15. A system as claimed in claim 9 further including pulse interval monitor means for monitoring an interval between adjacent pulses from said sensing means and selectively generating a signal indicating that the interval has become greater than a predetermined length of time wherein said speed control means responds to said signal from said pulse interval monitor means to produce a stop command signal for said driving means, thus avoiding overheating of a motor which would be encountered in case the transmission means from said motor to the door is disconnected.

16. An apparatus for controlling operation of an automatic door, comprising:
an electric motor;
movable driving means mechanically coupled with said motor and coupled to said door;
sensing means positioned relative to said movable driving means for generating pulses having a pulse repetition rate in proportion to a speed of said movable driving means;
door position detecting means coupled with said sensing means for counting said pulses to obtain a current position of the door; and
control means responsive to the obtained current door position for controlling operation of said motor.

* * * * *